United States Patent Office 2,981,730
Patented Apr. 25, 1961

2,981,730

ORGANOPHOSPHOROUS-MODIFIED CELLULOSE ESTERS

Eugene C. Martin, Texas City, and Joe T. Kelly, Dickinson, Tex., assignors to The American Oil Company, Texas City, Tex., a corporation of Texas No Drawing. Filed Aug. 29, 1957, Ser. No. 680,905

9 Claims. (Cl. 260—219)

This invention relates to modified cellulose esters and particularly concerns organophosphorous modified cellulose esters.

An object of the present invention is to provide new and useful modified cellulose esters. Another object is to provide organophosphorous modified cellulose esters. A further object is to provide a method for preparing such modified cellulose esters. These and other objects and advantages of the present invention will be pointed out more specifically in the detailed description of the invention.

In preparing the compositions of this invention, a cellulose ester containing free hydroxyl groups (attached to its anhydroglucose units) is dissolved in a solvent and is reacted with an organic chlorophosphorous compound under anhydrous conditions and in the presence of a hydrogen chloride acceptor. For example cellulose acetate-butyrate is dissolved in a solvent therefor and reacted with phenyldichlorophosphine oxide under anhydrous conditions and in the presence of a hydrogen chloride abstraction agent such as an organic amine. The free (i.e. unreacted) hydroxyl groups attached to the anhydroglucose units of the cellulose ester polymer react with the chlorine atoms in the organic chlorophosphorous compound and liberate hydrogen chloride which is taken up by the organic amine. The organophosphorous modified cellulose ester polymer is then recovered from the solvent. The modified and improved polymer has a lessened tendency toward flammability. It is more stable toward heat and solvents. When the polymer of the present invention is used in a permeation process for the separation of liquid chemicals it has advantages.

The compositions of the present invention may be prepared from any of a variety of cellulose ester polymers, provided such polymers contain free hydroxyl groups. Thus cellulose acetate, cellulose propionate, cellulose butyrate, cellulose acetate propionate, cellulose acetate-butyrate, etc. may be modified by incorporation of the organophosphorous compound therein. Similarly the organic chlorophosphorous compound reacted with the cellulose ester polymer may be any of a variety of compounds. Thus chlorophosphine oxides as represented by the structural formula $RPOCl_2$ and $R(R')POCl$, chlorophosphites as represented by $ROPCl_2$ and $RO(R'O)PCl$, phosphates as represented by $ROPOCl_2$ and $RO(R'O)POCl$, chlorophosphines as represented by $RPCl_2$ and $R(R')PCl$ (wherein R and R' signify the same or different hydrocarbon substituents) and similar organic phosphorous chlorides can be employed. The hydrocarbon radical as represented by R in the above formulae shown is not of critical importance. It may contain from 2 to 10 carbon atoms; it may be an alkyl, aryl, alkaryl, aralkyl, cycloalkyl, etc.; and may even contain other chemical substituents therein which preferably are not reactive with the hydroxyl groups attached to the cellulose ester.

In carrying out the reaction between organic chlorophosphorous compound and the cellulose ester, the ratio of these two reactants may be varied widely. Thus from 10% to 100% or more of the chlorophosphorous compound theoretically necessary to react with the free hydroxyl groups attached to the anhydroglucose units of the cellulose ester (theoretically, each chlorine atom attached to the phosphorous compound will react with one hydroxyl group) may be used. The reaction is carried out in a solvent for the cellulose ester which is inert toward the chlorophosphorous compound. The cellulose ester polymer is dissolved in a solvent such as acetone, dioxane, dimethoxyglycol, various substituted cellosolves or carbitols, etc. The solvent should be free of water since the reaction is carried out under anhydrous conditions which are essential to the elimination of side reactions. Side reactions would prevent the desired reaction from proceeding and thus prevent preparation of the desired modified ester. The hydrogen chloride acceptor or abstraction agent, by which is meant any agent which will hold the evolved hydrogen chloride captive, is added to the solution of the cellulose ester polymer in the solvent. Organic amines such as pyridine, picoline, morpholine, ethylenediamine, etc. may conveniently be employed in amounts sufficient to take up evolved hydrogen chloride by reaction therewith to form the hydrochloride salt of the organic amine. The organic chlorophosphorous compound is then added to the solution of cellulose ester polymer, solvent, and organic amine, and reaction between the chlorophosphorous compound and the cellulose ester is caused to proceed by heating the resultant mixture of reactants. Heating may be carried out from a temperature of about 40° C. up to the reflux temperature of the solution over a period of time between 0.5 and 5 hours or longer, depending upon the particular temperature at which the reaction is carried out. As was indicated, the organophosphorous modified cellulose ester polymer is formed by reaction of the chlorine atom of the chlorophosphorous compound with the free hydroxyl group contained on the cellulose molecule, with accompanying evolution of hydrogen chloride. Thus a bridge which may be represented by —O—P— links the cellulose molecule with the organophosphorous molecule. Cross-linking of the polymer may occur, especially when dichlorophosphorous compounds are used, and this has a beneficial effect upon the properties of the organophosphorous modified cellulose ester polymer when used as permeation membranes.

The organiphosphorous modified cellulose ester polymer may be recovered from the total reaction products by any conventional means. For example the total reaction products can be further diluted with the solvent and water (or some other liquid in which the organophosphorous modified cellulose ester polymer is insoluble) whereupon the phosphorous modified polymer is precipitated. It can thereafter be dried, cast into films, etc. A useful way of recovering the organophosphorous modified cellulose ester polymer from the total reaction products consists of diluting the total reaction products with a solvent therefor (acetone or other solvents such as have been mentioned previously) to decrease the viscosity. Thereafter a mixture of water and solvent, e.g. 50–50 mixture, is gradually added with stirring until the solution becomes hazy by reason of the formation of a gelatinous precipitate of the organophosphorous modified cellulose ester polymer. The water-solvent mixture may be added to precipitate all, or preferably only a fraction, of the modified cellulose polymer. The precipitated gel is then removed by decantation, and further amounts of the water-solvent mixture are gradually added to the decanted solution to precipitate the remainder of the modified cellulose ester polymer as a gel. Each of the two portions of the precipitated gel is separately dissolved in a solvent and the resultant solutions are poured into water to precipitate a fibrous polymer. Sufficient solvent i.e. 4 to 20 volumes per volume of gel is used in this step so that when the solution is poured into water, the polymer precipitates as a firm fiber rather than as a gelatinous material. Thereafter the fibres may be washed several times with water to remove any remaining amounts of solvent, drained dry, and then air dried. When a permeation membrane is prepared from the first precipitated portion produced in the manner described above, it provides higher selectivities and/or permeation rates for the permeation of hydrocarbons than if the membrane were prepared by totally precipitating the polymer. Thus this fractionation of the produced polymer is advantageous for the preparation of permeation membranes.

The following examples are given by way of illustration and are not intended as limiting the scope of this invention.

*Example 1*

Approximately 20 grams of cellulose acetate-butyrate (AB–502–10), having an average of 0.27 free hydroxyl groups, 0.53 acetyl groups and 2.2 butyryl groups per anhydroglucose unit, was dissolved in 200 ml. of dry dioxane. Dry pyridine in the amount of 6.3 grams was added to the solution and the mixture was heated to 70° C. Thereafter about 11.7 grams of phenyl dichlorophosphine oxide was added to the solution and the resultant mixture was maintained at approximately 70° C. for about 4 hours. Thus the solution of reactants contained 3.75 mols of phenyl dichlorophosphine oxide per mol of free hydroxyl groups (attached to the anhydroglucose units) contained in the solution of reactants.

The total reaction products were diluted with about 2 volumes of acetone to decrease the viscosity. A 50–50 water-acetone mixture was gradually added with stirring until the modified cellulose ester had precipitated as a gelatinous material. The gelatinous material was then separated from the solution and was redissolved in 8 parts of acetone. The acetone solution of the modified cellulose ester was then poured into water and a firm fibre precipitated. The fibres were washed several times with water to remove remaining traces of acetone, and were thereafter air dried.

Permeation membranes were prepared from the original cellulose acetate-butyrate (AB–502–10) and also from the organophosphorous modified cellulose acetate-butyrate. The membranes were prepared by dissolving each of the polymers separately in a solution composed of the following compounds in parts by volume: 30 parts benzene, 30 parts ethanol, 30 parts ethylene dichloride, 10 parts dioxane; thereafter casting films of the polymer in solution on chrome-plated panels and placing the panels under heat lamps to evaporate the solvent. The films which were 1 mil thickness were thereafter removed from the panels.

The permeation experiments were carried out employing a permeation apparatus which consisted of a box-like feed chamber for the feed mixture of liquid hydrocarbons introduced therein; a smaller size membrane holder of box-like shape having 5 open faces across which the membranes prepared in the manner described above were sealed, the 6th face having sealed thereto a line for removing the portion which permeated through the membrane into the interior (permeate zone) of the membrane holder, the entire membrane holder being positioned within the feed chamber; and associated pumps, pressure regulating and measuring devices, and temperature controls by which the pressure and temperature in the feed and permeate zones were maintained at the conditions desired. The total surface area provided by the membranes was approximately 22 sq. in. In the first run the membrane employed was the organophosphorous modified cellulose ester prepared in the manner described previously, and in the second run the membrane used was the original unmodified cellulose acetate-butyrate. A 50–50 liquid mixture of benzene and cyclohexane was charged to the feed zone of the permeation apparatus. The feed zone was maintained at 80° C. and atmospheric pressure, conditions which caused refluxing of the feed mixture in the feed zone. The permeate zone was maintained at 30 mm. Hg abs. The permeated portions were collected and analyzed. The composition of the permeated portion obtained when the two different membrane compositions were used is shown in the following table:

| Permeation Membrane | Benzene Concentration In Permeate, Percent | Membrane Separation Factor [1] |
|---|---|---|
| Organophosphorous-modified cellulose ester | 72.8 | 2.7 |
| Unmodified cellulose ester | 67.0 | 2.0 |

[1] Separation factor = $\dfrac{B_p C_f}{C_p B_f}$

Where B and C denote the concentrations of benzene and cyclohexane respectively, and subscripts $p$ and $f$ indicate it to be of the permeate and feed respectively.

The real advantage of the improved selectivity of the organophosphorous modified cellulose ester is better appreciated by considering the improvement in the separation factor of the membrane from 2.0 (using the unmodified cellulose ester) to 2.7.

*Example 2*

25.4 grams of cellulose acetate-butyrate (AB–500–1), which had been partially hydrolyzed to add more hydroxyl groups than the initially present 0.15 hydroxyl groups per anhydroglucose unit, was dissolved in 200 ml. of dry dioxane. Dry pyridine in the amount of 6.3 grams was added to the solution and the mixture was heated to 70° C. Thereafter 18.3 grams of dibutyl chlorophosphate was added to the solution and the resultant mixture was maintained at approximately 70° C. for 4 hours. The reaction products were worked up in the manner described in Example 1, and film of 1 mil thickness was prepared from the organophosphorous modified cellulose acetate-butyrate for evaluation as a permeation membrane material. The corresponding non-modified partially hydrolyzed cellulose acetate-butyrate was also evaluated as a permeation membrane to provide a standard for comparison. The permeation runs were carried out in the same manner as described in Example 1. The results obtained follow:

Permeation membrane: Permeation rate [1]
   Organophosphorous-modified cellulose ester ____ 70
   Unmodified cellulose ester _____ 37

[1] Gallons/hour/thousand sq. ft. membrane surface.

The great increase in the permeation rate obtained by using the organophosphorous modified cellulose ester is apparent.

*Example 3*

25 grams of cellulose acetate-butyrate (AB–381–0.5), which had been partially hydrolyzed to add more hydroxyl groups than the initially present .33 hydroxyl groups per anhydroglucose unit, was dissolved in 200 ml. of dry dioxane. Dry pyridine in the amount of 6.3 grams was added to the solution and the mixture was heated to 70° C. Thereafter 10.3 grams of diethyl chlorophosphate was added to the solution and the solution was maintained at about 70° C. for 4 hours. The total reaction products were diluted with about 2 volumes of acetone to decrease the viscosity. Thereafter a 50–50 water-acetone mixture was gradually added along with stirring until approximately 40% of the modified cellulose acetate-butyrate had precipitated as a gelatinous material. This gelatinous material was then separated from the solution, and additional amounts of the 50–50 water-acetone mixture was gradually added together with stirring to the decanted solution to precipitate the remainder of the modified cellulose ester as a gelatinous material. The gelatinous materials were then separately dissolved in 8 parts of acetone. The acetone solutions of the modified cellulose ester were then separately poured into water and firm fibres were precipitated. The precipitated fibres were separately washed with water to remove remaining traces of acetone, and were thereafter dried. Permeation membranes were prepared from the first precipitated modified cellulose ester and also from the second precipitated modified cellulose ester in the manner described in Example 1. To provide a standard for comparison of the effect of modifying the cellulose acetate-butyrate, the same partly hydrolyzed cellulose acetate-butyrate (AB–381–0.5) which had not been modified was also prepared in the form of a permeation membrane. Permeation runs were carried out according to the method described in Example 1, while using the permeation membranes described in this example. The results obtained are as follows:

| Permeation membrane: | Permeation rate [1] |
|---|---|
| 1st fraction of organophosphorous-modified cellulose ester | 175 |
| 2nd fraction of organophosphorous-modified cellulose ester | 156 |
| Unmodified cellulose ester | 122 |

[1] Gallons/hour/thousand sq. ft. membrane surface.

It is evident that both the first and second precipitated portions of the organophosphorous modified cellulose acetate-butyrate display higher permeation rates than does the corresponding non-modified cellulose acetate-butyrate. The first precipitated portion of the organophosphorous modified cellulose acetate-butyrate provides higher permeation rates than does the second precipitated portion.

Detailed descriptions of a permeation process and separations thereby effected may be found in U.S. 2,159,434, U.S. 2,475,990, and in other references. In general, the permeation process consists of introducing a feed mixture of chemical compounds to be separated into a feed zone. The feed zone is separated by the permeation membrane from the permeate zone. The composition of the mixture which permeates through the membrane is different from the composition of the feed mixture, and this enables resolution of the feed mixture into its components. Since permeation is a non-equilibrium process, the components in the permeate zone are withdrawn therefrom, preferably continuously. The permeation membrane should be as thin as possible, e.g. 1 mil or less in order to obtain maximum permeation rates. It is preferred to maintain the mixture in the feed zone which is in contact with the membrane in the liquid state in order to obtain maximum permeation rates. This, however, makes stability of the membrane in contact with the liquid feed an important factor. The organophosphorous modified cellulose ester is stable at higher temperatures than is the unmodified cellulose ester. This enables the use of higher permeation temperatures which are desirable since permeation rates increase substantially with increasing permeation temperatures. The pressure in the feed zone is preferably that which is sufficient to maintain the feed in the liquid state. It is preferred to remove the permeated portion in the vapor state from the permeate zone, and atmospheric or subatmospheric pressures may be maintained in the permeate zone to this end.

Not only are the organophosphorous modified cellulose ester films useful as improved permeation membranes, but they are very useful packaging materials because of their improved flame resistance and effectiveness as water vapor barriers.

While the invention has been described with reference to certain examples, it should not be construed as so limited, but includes within its scope other modifications as would occur to those skilled in this art.

Thus having described the invention what is claimed is:

1. As a composition of matter, an organophosphorous modified cellulose ester which is prepared by dissolving a carboxylic acid ester of cellulose containing free hydroxyl groups in a solvent and reacting an organic chlorophosphorous compound with said cellulose ester under anhydrous conditions and in the presence of a hydrogen chloride acceptor and thereby producing an organophosphorous modified cellulose ester in solution in said solvent, commingling with said solution a liquid in which the organophosphorous modified cellulose ester is insoluble, said liquid being used in an amount to cause precipitation of a first fraction comprising only a fibrous portion but not all of said organophosphorous modified cellulose ester in fibrous form, and recovering a film of the precipitated portion of the fibrous organophosphorous modified cellulose ester.

2. The composition of claim 1 wherein the carboxylic acid ester of cellulose is cellulose acetate-butyrate.

3. The composition of claim 1 wherein the carboxylic acid ester of cellulose is cellulose acetate.

4. The composition of claim 1 wherein the organic chlorophosphorous compound is phenyl dichlorophosphine oxide.

5. The composition of claim 1 wherein the organic chlorophosphorous compound is diethyl chlorophosphate.

6. The composition of claim 1 wherein cellulose acetate-butyrate is reacted with diethyl chlorophosphate.

7. The composition of claim 1 wherein cellulose acetate-butyrate is reacted with dibutyl chlorophosphate.

8. A permeation membrane comprising a film of an organophosphorous modified cellulose ester, which is prepared by dissolving a carboxylic acid ester of cellulose containing free hydroxyl groups in a solvent and reacting an organic chlorophosphorous compound with said cellulose ester under anhydrous conditions and in the presence of a hydrogen chloride acceptor and producing therefrom an organophosphorous modified cellulose ester in solution in said solvent, commingling with said solution a liquid in which the organophosphorous modified cellulose ester is insoluble, said liquid being used in an amount to cause precipitation of a fibrous portion of said organophosphorous modified cellulose ester, and recovering a film of the precipitated fibrous portion of the organophosphorous modified cellulose ester.

9. A non-porous permeation membrane comprising a polymer consisting of a first precipitated fibrous portion of an organophosphorous modified cellulose ester produced by reacting an organic chlorophosphorous compound with a carboxylic acid ester of cellulose containing free hydroxyl groups.

References Cited in the file of this patent

UNITED STATES PATENTS

| 2,003,408 | Weihe | June 4, 1935 |
| 2,008,986 | Malm et al. | July 23, 1935 |
| 2,678,309 | Van Gorder | May 11, 1954 |